United States Patent
Tsuchiya et al.

(10) Patent No.: US 11,725,922 B2
(45) Date of Patent: Aug. 15, 2023

(54) JIG FOR AND METHOD OF MEASURING LENGTH OF STUD BOLT

(71) Applicant: MITSUBISHI HEAVY INDUSTRIES, LTD., Tokyo (JP)

(72) Inventors: Yohei Tsuchiya, Tokyo (JP); Takahiro Igawa, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 17/829,988

(22) Filed: Jun. 1, 2022

(65) Prior Publication Data

US 2023/0003500 A1 Jan. 5, 2023

(30) Foreign Application Priority Data

Jun. 30, 2021 (JP) ................................. 2021-108876

(51) Int. Cl.
*G01B 5/02* (2006.01)
*G01B 3/1003* (2020.01)

(52) U.S. Cl.
CPC ............ *G01B 5/025* (2013.01); *G01B 3/1003* (2020.01)

(58) Field of Classification Search
CPC ...... G01B 5/025; G01B 3/1003; G01B 5/061; G01B 3/20; G01B 5/02; G01B 3/18; G01B 5/0002
See application file for complete search history.

(56) References Cited

U.S. PATENT DOCUMENTS

| | | | | |
|---|---|---|---|---|
| 4,241,508 A | * | 12/1980 | Cordner | G01B 5/14 33/655 |
| 5,515,614 A | * | 5/1996 | Wing | G01B 3/36 33/562 |
| 9,335,144 B2 | * | 5/2016 | Wagstaff | G01B 3/28 |
| 9,372,060 B1 | * | 6/2016 | Howard | G01B 3/20 |
| 9,618,313 B1 | * | 4/2017 | Johnson | G01B 3/08 |
| 10,054,416 B2 | * | 8/2018 | Morille | G01B 3/20 |

(Continued)

FOREIGN PATENT DOCUMENTS

JP 2004-225692 A 8/2004

*Primary Examiner* — Yaritza Guadalupe-McCall
(74) *Attorney, Agent, or Firm* — WHDA, LLP (57) ABSTRACT

A length measuring jig measures the length of a tubular stud bolt with a central hole defined axially therethrough while the tubular stud bolt remains mounted on a target product such as a steam turbine casing. The length measuring jig includes a rod to be inserted into the central hole in the stud bolt, a first jaw provided on a tip end of the rod for abutting against an end face of the one side in longitudinal direction of the stud bolt, a slider on which the rod is slidably supported, a second jaw provided on the slider for abutting against an end face of the other side in longitudinal direction of the stud bolt, and a cap to be fitted in the central hole in the stud bolt and having a slit defined therein for allowing the rod to extend therethrough. The first jaw has an overall length smaller than a diameter of a minimum-diameter portion of the central hole in the stud bolt. The cap has an inner wall surface defining an end of the slit in the cap, and a distance to the inner wall surface from a central axis of the stud bolt is equal to a radius of the minimum-diameter portion of the central hole in a state in which the cap is fitted in the central hole in the stud bolt.

6 Claims, 7 Drawing Sheets

(56) References Cited

U.S. PATENT DOCUMENTS

| | | | |
|---|---|---|---|
| 2006/0201257 A1* | 9/2006 | Soechting | G01B 5/205 73/112.01 |
| 2013/0152398 A1* | 6/2013 | Wagstaff | B21D 53/92 264/334 |
| 2017/0102220 A1* | 4/2017 | Morille | G01B 3/20 |
| 2023/0003500 A1* | 1/2023 | Tsuchiya | G01B 3/1003 |

* cited by examiner

JIG FOR AND METHOD OF MEASURING LENGTH OF STUD BOLT

BACKGROUND OF THE INVENTION

1. Field of the Invention

The present invention relates to a jig for and a method of measuring the length of a tubular stud bolt having a central hole extending axially therethrough, i.e., measuring a time-dependent change in the length of such a tubular stud bolt, without removing the tubular stud bolt from a product such as a steam turbine casing.

2. Description of the Related Art

Approaches to judging the integrity of a bolt in use to decide whether it can continuously be used or not include a process for evaluating the deterioration of the material of the bolt by measuring the hardness of the bolt and observing changes in the metallographic structure of the bolt and a process for evaluating the deterioration of the material of the bolt by measuring a time-depending change in the elongation of the bolt due to creep. The latter process that directly measures elongation is useful as a simple process and is widely used on high-temperature parts (JP-2004-225692-A).

PRIOR ART DOCUMENT

Patent Document

Patent document 1: JP-2004-225692-A

SUMMARY OF THE INVENTION

A number of stud bolts are used to fasten upper and lower half casings for steam turbines to each other. Since these stud bolts are heavy, it requires a large expenditure of labor and a number of man-hours to remove the stud bolts one by one from the casings and measure their lengths for measuring their elongation at the time of maintenance.

Furthermore, inasmuch as the elongation of stud bolts due to creep is very small, it is necessary to measure their lengths highly accurately.

It is an object of the present invention to provide a jig for and a method of measuring the length of a tubular stud bolt having a central hole extending axially therethrough while the tubular stud bolt remains mounted on a target product such as a steam turbine casing.

To achieve the above object, according to the present invention, there is provided a length measuring jig for measuring a length of a stud bolt for fastening a first part and a second part of a product to each other, while the stud bolt remains mounted on the product, the stud bolt having a through central hole defined therein that has different diameters in different longitudinal portions, a threaded portion on one side in longitudinal direction thereof that is to be threaded into the first part, and a threaded portion on another side in longitudinal direction thereof to which a nut is attached, the length measuring jig including: a rod to be inserted into the central hole in the stud bolt; a first jaw that is provided on a tip end of the rod and caused to abut against an end face of the one side in longitudinal direction of the stud bolt; a slider on which the rod is slidably supported; a second jaw that is provided on the slider and caused to abut against an end face of the other side in longitudinal direction of the stud bolt; and a cap that is to be fitted in the central hole in the stud bolt and has a slit defined therein for allowing the rod to extend therethrough, in which the first jaw has an overall length smaller than a diameter of a minimum-diameter portion of the central hole in the stud bolt, and the cap has an inner wall surface defining an end of the slit in the cap, and a distance to the inner wall surface from a central axis of the stud bolt is equal to a radius of the minimum-diameter portion of the central hole in a state in which the cap is fitted in the central hole in the stud bolt.

According to the present invention, the length measuring jig is capable of measuring the length of a tubular stud bolt with a central hole defined axially therethrough while the tubular stud bolt remains mounted on a target product such as a steam turbine casing.

DESCRIPTION OF THE PREFERRED EMBODIMENTS

A jig for and a method of measuring the length of a tubular stud bolt according to a preferred embodiment of the present invention will be described in detail below. The jig will also be referred to as "length measuring jig" hereinbelow.

—Turbine—

Figure 1:
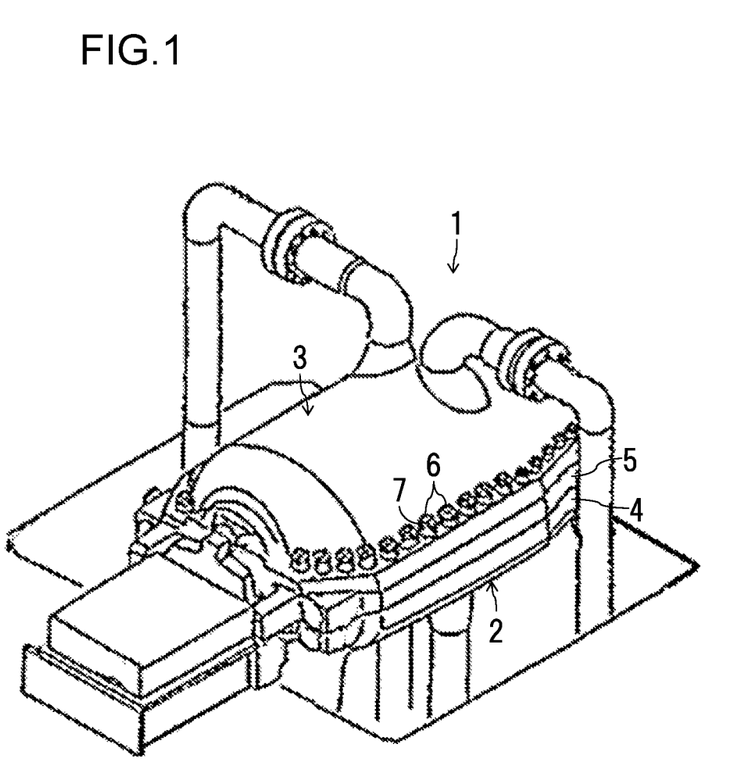
FIG. 1 is a perspective view of a steam turbine casing as a product incorporating stud bolts whose lengths are to be measured by a length measuring jig according to an embodiment of the present invention.

FIG. 1 illustrates in perspective a steam turbine casing 1 as a product incorporating stud bolts whose lengths are to be measured by the length measuring jig according to the present embodiment. The steam turbine casing 1 will also be referred to as "casing 1". In FIG. 1, the steam turbine casing 1 is illustrated as a high/medium pressure steam turbine casing by way of example. However, the principles of the present invention are also applicable to a jig for and a method of measuring the length of a tubular stud bolt incorporated in other products such as a high-pressure steam turbine casing, a low-pressure steam turbine casing, a gas turbine casing, etc.

As illustrated in FIG. 1, the casing 1 is of a vertically separable structure including a lower half casing 2 and an upper half casing 3. The lower half casing 2 and the upper half casing 3 are coupled to each other with their respective flanges 4 and 5 fastened to each other by a number of stud bolts 6 and nuts 7. The flanges 4 and 5 lie horizontally and the stud bolts 6 extend vertically. The flange 4 of the lower half casing 2 has a number of blind holes 8, see FIG. 2, defined therein, and the flange 5 of the upper half casing 3 has a number of through holes, not shown, defined therein for allowing the stud bolts 6 to extend therethrough. The blind holes 8 are defined by internally threaded surfaces of the flange 4. The stud bolts 6 have threaded portions on both sides in the longitudinal direction (up and down in the FIG. 1 posture) that are externally threaded. To fasten the flanges 4 and 5 to each other with the stud bolts 6 and the nuts 7, the stud bolts 6 are inserted through the through holes in the flange 5 of the upper half casing 3 into the blind holes 8 in the flange 4 of the lower half casing 2. The lower threaded portions of the stud bolts 6 are threaded into the blind holes 8, and the nuts 7 are threaded over the upper threaded portions of the stud bolts 6, thereby fastening the flanges 4 and 5 to each other.

—Stud Bolts—

Figure 2:
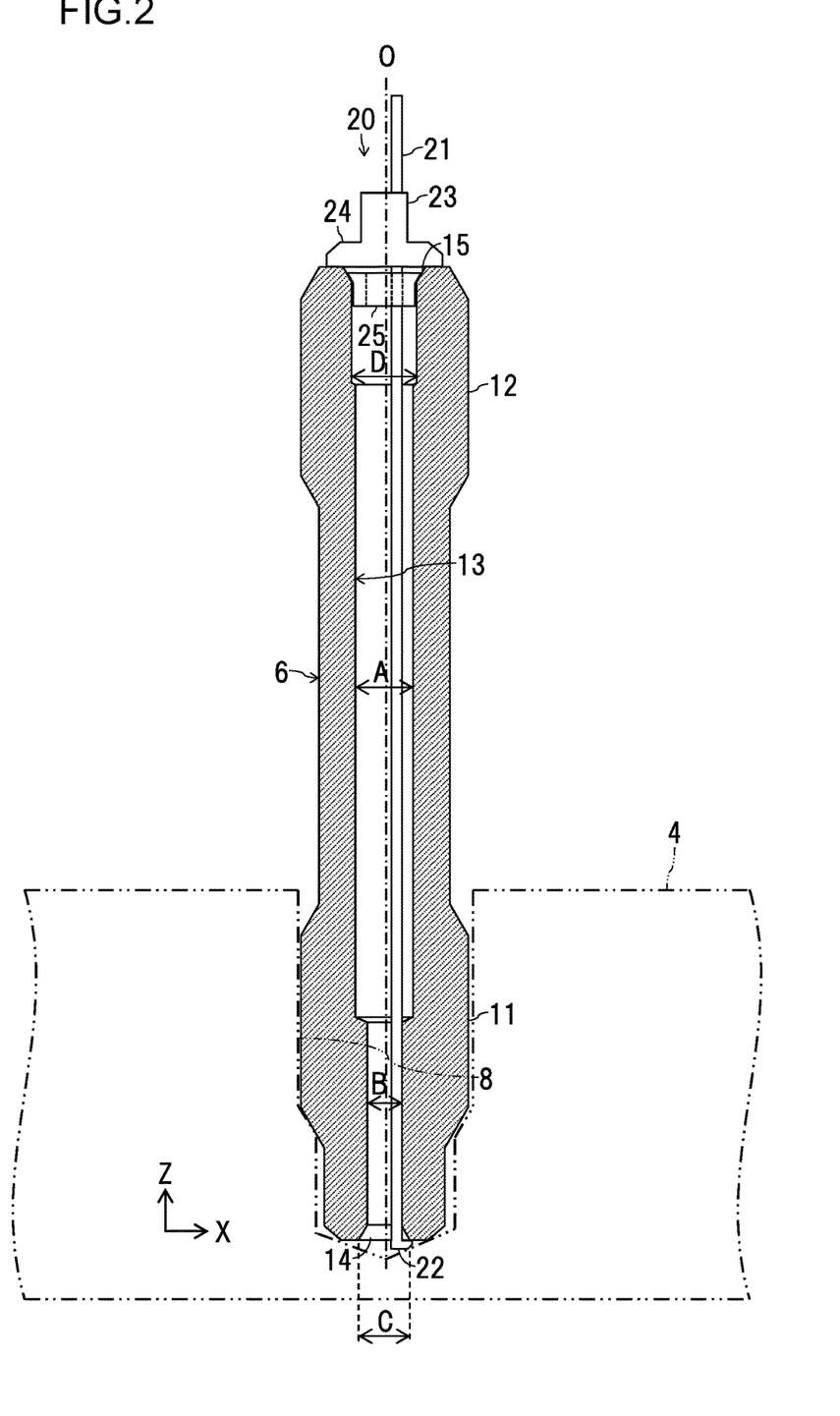
FIG. 2 is a longitudinal cross-sectional view illustrating the manner in which the length of one of the stud bolts illustrated in FIG. 1 is measured by the length measuring jig.

FIG. 2 illustrates in cross section the manner in which the length of one of the stud bolts 6 illustrated in FIG. 1 is measured by the length measuring jig. Those elements illustrated in FIG. 2 that are identical to those illustrated in FIG. 1 are denoted by identical reference characters, and will be omitted from description. According to the present embodiment, an XYZ coordinate system having X, Y, and Z axes that are perpendicular to each other is illustrated in some figures of the drawings to provide a frame of reference for directions that will be referred to in the description.

As described above, the stud bolts 6 fasten the lower half casing 2, i.e., a first part, and the upper half casing 3, i.e., a second part, of the casing 1, i.e., a product, to each other in cooperation with the nuts 7, see FIG. 1. As illustrated in FIG. 2, the stud bolt 6 has a threaded portion 11 on one side in the longitudinally directions thereof, i.e., the lower end portion in FIG. 2, and a threaded portion 12 on the other side in the longitudinally direction thereof, i.e., the upper end portion in FIG. 2. The term "longitudinally" referred to above represents longitudinal directions of the stud bolt 6 that extend along the Z-axis of the XYZ coordinate system. The threaded portion 11 is threaded into the blind holes 8 in the flange 4, and the nuts 7 are threaded over the threaded portion 12. The flanges 4 and 5 of the lower half casing 2 and the upper half casing 3 are of thick dimensions, and the stud bolts 6 that extend through the flange 5 have their threaded portions 11 and 12 protruding above and below the flange 5. The stud bolts 6 are considerably long and may actually be approximately 1.5 m long.

The stud bolt 6 whose length is to be measured by a length measuring jig 20 to be described later is of a tubular shape and has a longitudinally through axial central hole 13. The central hole 13 is concentric with the stud bolt 6. The central hole 13 has different diameters in different longitudinal portions thereof. For example, the central hole 13 has a diameter A in a longitudinally central portion thereof. The central hole 13 has a smaller diameter B in a lower end portion thereof near the lower end portion of the stud bolt 6 in FIG. 2 that is threaded into the blind hole 8, so that the central hole 13 is narrower in the lower end portion thereof near the lower end portion in FIG. 2 that is threaded into the blind hole 8. The diameter B is the minimum diameter of the central hole 13. The central hole 13 also has a larger diameter D, to be described later, in an upper end portion thereof near the upper end portion of the stud bolt 6 in FIG. 2 over which the nut 7 is threaded. The central hole 13 is open at longitudinally opposite ends of the stud bolt 6 that have beveled edges 14 and 15, respectively. Specifically, the lower end of the stud bolt 6 has the beveled edge 14 whereas the upper end of the stud bolt 6 has the beveled edge 15. The diameter B of the central hole 13 in the end portion thereof near the lower end portion in FIG. 2 that is threaded into the blind hole 8 represents the diameter, i.e., the minimum diameter, of a smallest-diameter portion of the central hole 13, i.e., a minimum-diameter portion of the central hole 13. The opening of the central hole 13 in one of the longitudinally opposite ends of the stud bolt 6 in the lower end portion in FIG. 2 that is threaded into the blind hole 8 has a diameter C larger than the diameter B.

—Length Measuring Jig—

As illustrated in FIG. 2, the length of the stud bolt 6 can be measured by the length measuring jig 20, while the stud bolt 6 remains mounted on the casing 1 as a product. In FIG. 2, the upper half casing 3 is omitted from illustration for illustrative purposes. The length measuring jig 20 may measure the length of the stud bolt 6 with the upper half casing 3 mounted on the lower half casing 2. The length measuring jig 20 measures the length of the stud bolt 6 while most of the length measuring jig 20 is being inserted in the stud bolt 6 as described later.

Figure 3:
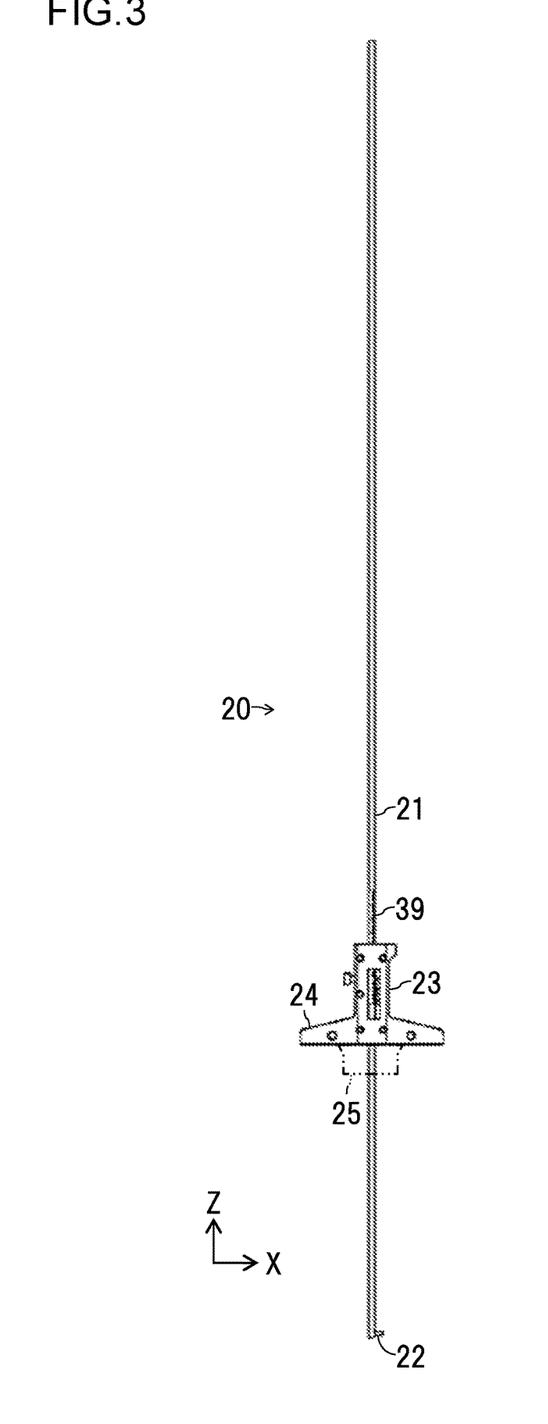
FIG. 3 is an entire elevational view of the length measuring jig according to the embodiment of the present invention.

FIG. 3 illustrates the length measuring jig 20, in its entirety, for measuring the length of a stud bolt according to the present embodiment. Those elements illustrated in FIG. 3 that are identical to those illustrated in FIG. 2 are denoted by identical reference characters. The length measuring jig 20 illustrated in. 2 and 3 includes a rod 21, a lower jaw, i.e., a first jaw, 22, a slider 23, an upper jaw, i.e., a second jaw, 24, and a cap 25. These elements of the length measuring jig 20 will be described successively below.

—Slider—

Figure 4:
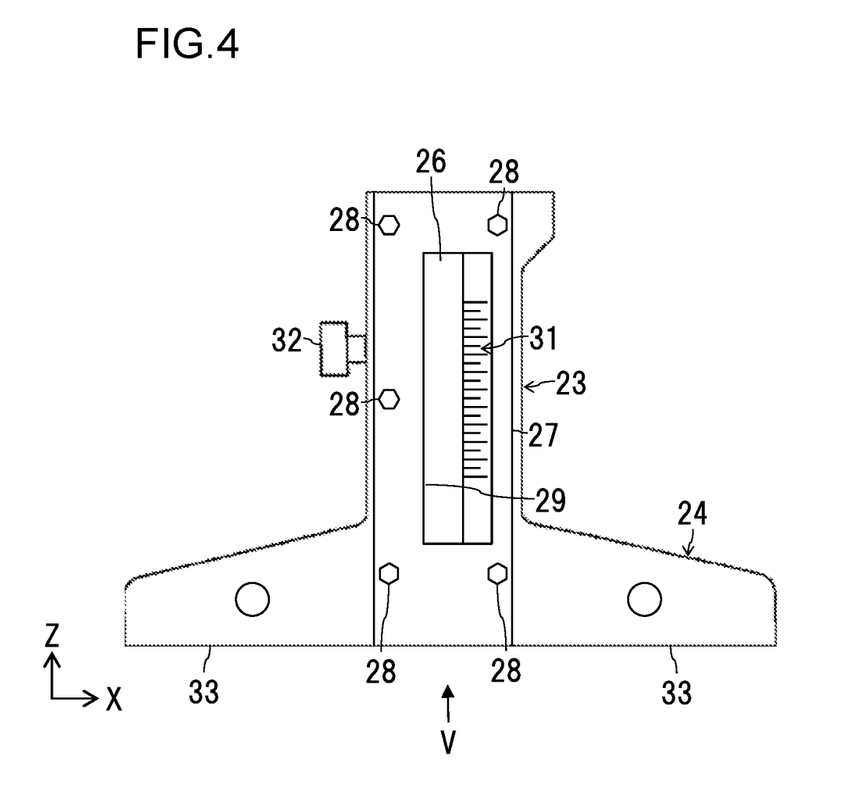
FIG. 4 is an enlarged side elevational view of a slider of the length measuring jig illustrated in FIG. 3.
Figure 5:
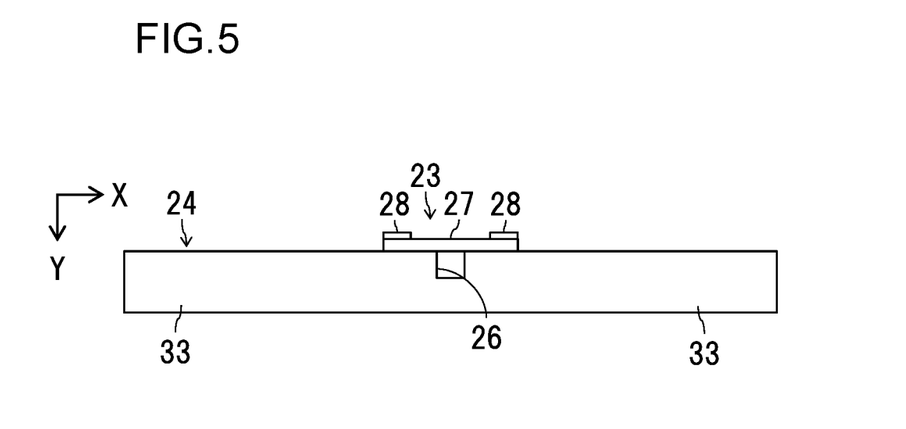
FIG. 5 is a bottom view of the slider as seen in the direction indicated by the arrow V in FIG. 4.

FIG. 4 illustrates the slider 23 in side elevation, and FIG. 5 illustrates the slider 23 in bottom view as seen in the direction indicated by the arrow V in FIG. 4. As illustrated in FIGS. 4 and 5, the slider 23 is a plate-shaped component on which the rod 21 is slidably supported. The slider 23 has a guide groove 26 defined in a front surface that faces in one direction along the Y-axis toward the viewer of FIG. 4, i.e., an upper surface in FIG. 5, and extending along the Z-axis. The guide groove 26 extends from one end face of the slider 23 along the Z-axis to the other end face of the slider 23 along the Z-axis.

A holder plate 27 is attached to the front surface of the slider 23 across and over the guide groove 26 by a plurality of screws 28. The holder plate 27 covers part of the guide groove 26 that is open in the front surface of the slider 23. The rod 21, not shown in FIGS. 4 and 5, extends through the guide groove 26 covered by the holder plate 27. The rod 21 is guided in the guide groove 26 by the holder plate 27 for sliding movement in its longitudinal directions along the Z-axis. However, the rod 21 may be guided with respect to the slider 23 by any of various other structures than the structure including the guide groove 26 and the holder plate 27 illustrated in FIGS. 4 and 5.

The holder plate 27 has a window 29 defined therein for allowing the user to visually recognize the boundary between the rod 21 in the guide groove 26 and a surface of the slider 23 through the window 29. The surface of the slider 23 has a graduated scale, i.e., a vernier scale, 31 that can be seen through the window 29.

A screw clamp 32 is mounted on a side surface of the slider 23 that faces in a direction along the X-axis i.e., a left side along the X-axis in FIG. 4. When the screw clamp 32 is tightened, the rod 21 is fixed in position with respect to the slider 23. Once the screw clamp 32 has been tightened, the length measuring jig 20 can measure the length of the stud bolt 6 even after the rod 21 has been removed from the stud bolt 6.

—Upper Jaw—

The upper jaw 24 is included in the slider 23. According to the present embodiment, the upper jaw 24 is integrally formed with an end portion of the slider 23 in a downward direction along the Z-axis in FIG. 4, i.e., a lower end portion of the slider 23. Alternatively, the upper jaw 24 may be separate from the slider 23 and mounted on the slider 23. The upper jaw 24 extends in opposite directions along the X-axis across the slider 23. The slider 23 and the upper jaw 24 are jointly shaped as an inverted "T" in FIG. 4. The upper jaw 24 has a measuring surface 33 for abutting against an end face of the stud bolt 6 that faces upwardly along the Z-axis, i.e., an upper end face in FIG. 2, of the stud bolt 6. The measuring surface 33 faces downwardly along the Z-axis in FIG. 4 toward the lower jaw 22. When the length measuring jig 20 is set on the stud bolt 6 with the rod 21 inserted in the central hole 13, the measuring surface 33 of the upper jaw 24 is held in contact with the upper end face of the stud bolt 6 across the central hole 13.

—Cap—

Figure 6:
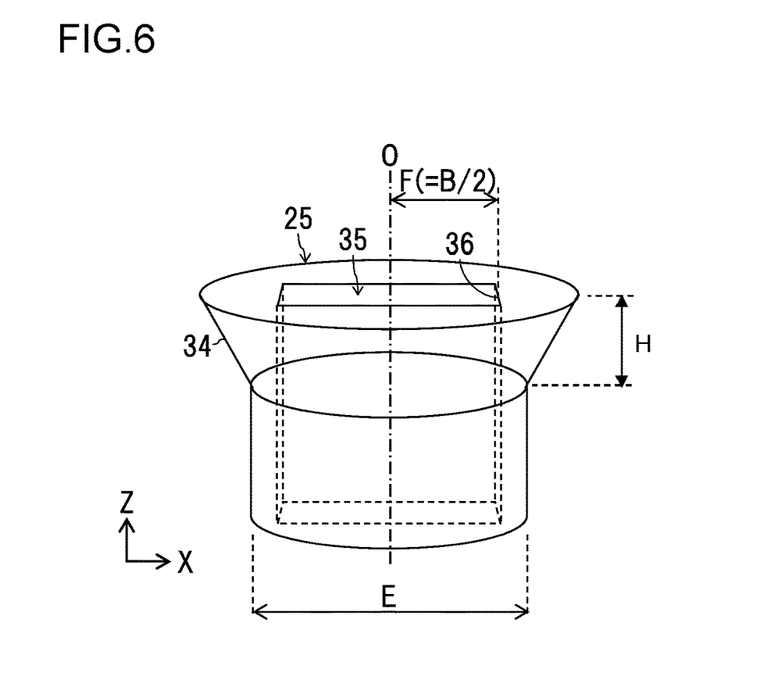
FIG. 6 is a perspective view of a cap of the length measuring jig illustrated in FIG. 3.

FIG. 6 illustrates the cap 25 in perspective. The cap 25 illustrated in FIG. 6 is fitted in the central hole 13 in the upper end portion of the stud bolt 6. As illustrated in FIG. 6, the cap 25 includes a cylindrical body and a tapered head 34 disposed on an upper end of the cylindrical body. The tapered head 34 has a tapered circumferential surface inclined to the central axis, denoted by O (see also FIG. 2), of the stud bolt 6 at an angle that matches the angle of the beveled edge 15 of the upper end of the stud bolt 6 around the central hole 13. The tapered head 34 has a dimension, i.e., an axial length, H along the Z-axis that is shorter than the dimension along the Z-axis of the beveled edge 15. The cylindrical body of the cap 25 that is positioned beneath the tapered head 34 has a diameter E slightly smaller than the diameter D of the upper end portion of the central hole 13, except the beveled edge 15, in the stud bolt 6. When the cap 25 is inserted into the upper end portion of the central hole 13, the tapered head 34 is snugly held against the beveled edge 15 and does not protrude axially from the upper end face of the stud bolt 6. The tapered head 34 is guided by the beveled edge 15 and centered in the central hole 13 in alignment with the central axis O of the stud bolt 6. The cap 25 can easily be removed from the upper end of the stud bolt 6 after the length measuring jig 20 has measured the length of the stud bolt 6.

The cap 25 has a slit 35 defined axially therethrough for allowing the rod 21 to extend therethrough. The slit 35 extends axially through the cap 25 along the Z-axis and has a rectangular opening that is elongate along the X-axis in an XY plane defined by the X-axis and the Y-axis, in contrast to a square cross-sectional shape, to be described later, of the rod 21. The slit 35 is shaped as a through hole in the shape of a rectangular parallelepiped according to the present embodiment. Alternatively, the slit may be shaped as an U-shaped opening that is open at a longitudinal end thereof along the Z-axis. The slit 35 has a transverse dimension along the Y-axis in FIG. 6 that is slightly larger than the transverse dimension of the square cross-sectional shape of the rod 21. When the rod 21 is inserted in the slit 35 in the cap 25, the rod 21 can be guided by the slit 35 to move longitudinally therein and radially in the stud bolt 6.

The slit 35 as the through hole has an end defined by an inner wall surface 36 of the cap 25 that is positioned at a longitudinal end of the opening of the slit 35, i.e., a right end along the X-axis in FIG. 6. The inner wall surface 36 is positionally adjusted as a surface for positioning the rod 21 extending through the slit 35. Specifically, while the cap 25 is being fitted in the central hole 13 in the stud bolt 6, the inner wall surface 36 is positioned such that the distance F from the central axis O of the stud bolt 6 to the inner wall surface 36 is equal to the minimum radius (=B/2) of the central hole 13.

—Rod—

Figure 7:
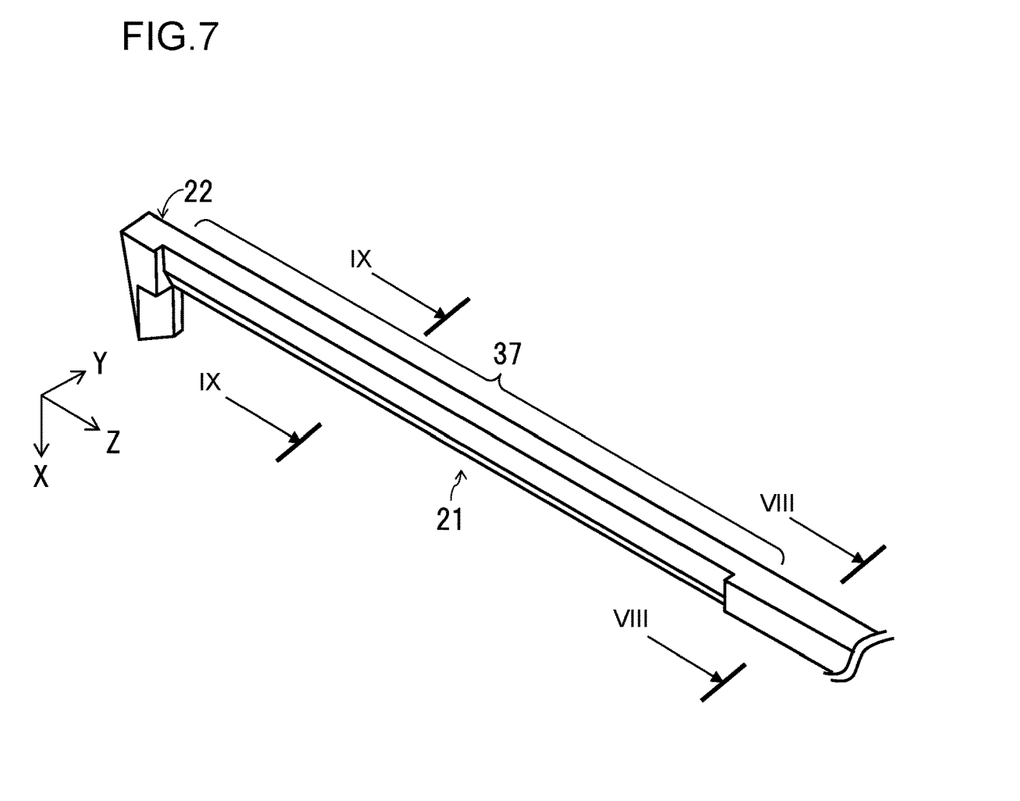
FIG. 7 is a fragmentary perspective view of a portion of a rod of the length measuring jig illustrated in FIG. 3.
Figure 8:
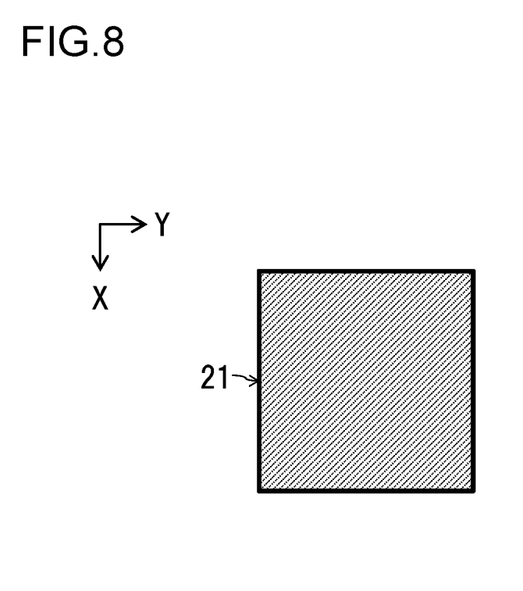
FIG. 8 is an enlarged cross-sectional view taken along line VIII-VIII of FIG. 7.
Figure 9:
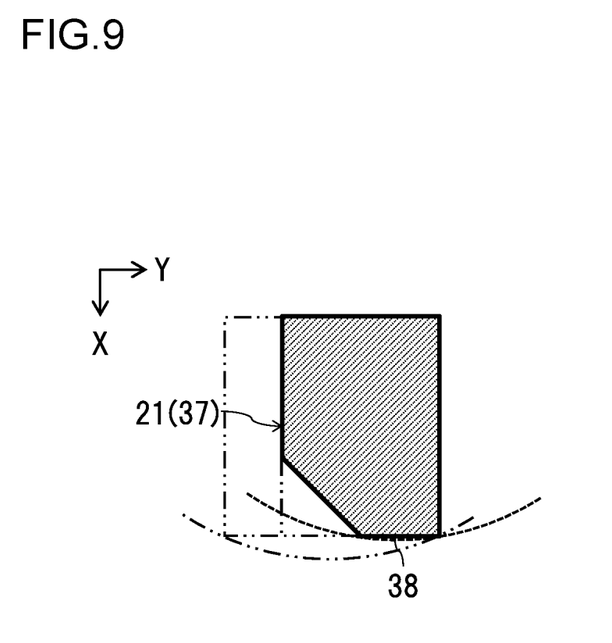
FIG. 9 is an enlarged cross-sectional view taken along line IX-IX of FIG. 7.

FIG. 7 illustrates a portion of the rod 21 in fragmentary perspective. FIG. 8 illustrates the rod 21 in enlarged cross section taken along line VIII-VIII of FIG. 7. FIG. 9 illustrates the rod 21 in enlarged cross section taken along line IX-IX of FIG. 7. In FIG. 7, a lower portion of the rod 21 in FIG. 3 is illustrated.

The rod 21 is an elongate component to be extended through the central hole 13 in the stud bolt 6. The rod 21 has a graduated scale, i.e., a main scale, 39 (see FIG. 3). According to the present embodiment, most of the rod 21 has a square cross-sectional shape as illustrated in FIG. 8. According to the present embodiment, the length measuring jig 20 measures the length of the stud bolt 6 from a reading of the graduated scales 31 and 39. However, the length measuring jig may be arranged to measure the length of the stud bolt 6 from a reading of a dial vernier caliper or a digital Vernier caliper.

The rod 21 includes an upper portion that is not illustrated in FIG. 7, but illustrated in FIG. 3 and has the same square cross-sectional shape as illustrated in FIG. 8. However, the rod 21 includes a portion 37 near its tip end that supports the lower jaw 22, as the lower portion of the rod 21 illustrated in FIG. 3. As illustrated in FIG. 9, the portion 37 has a side surface, i.e., a left side surface in FIG. 9, facing in a direction along the Y-axis, i.e., a transverse direction of the slit 35 in the cap 25, and offset in an opposite direction along the Y-axis. Therefore, the portion 37 has a reduced thickness along the Y-axis compared with the thickness of the remaining portion of the rod 21 that has the square cross-sectional shape. The portion 37 includes, partly or wholly, a region for abutting against the inner circumferential surface of the stud bolt 6 that defines the minimum-diameter portion of the central hole 13 that has the diameter B at the time of measuring the length of the stud bolt 6.

The portion 37 of the rod 21 has a beveled corner between the side surface, i.e., the left side surface in FIG. 9, facing in the direction along the Y-axis and offset in the opposition direction along the Y-axis, and a side surface 38, i.e., a lower side surface in FIG. 9, facing in a direction along the X-axis toward the inner wall surface 36 of the cap 25. Therefore, the portion 37 has a cross-sectional shape progressively narrower in the direction along which a hook 42 (see FIG. 10), to be described later, of the lower jaw 22 extends. The side surface 38 of the portion 37 to be brought into abutment against the inner circumferential surface of the stud bolt 6 that defines the central hole 13 has a smaller width along the Y-axis than the width of a corresponding side surface of the portion of the rod 21 that has the square cross-sectional shape illustrated in FIG. 8. When the rod 21 is inserted in the central hole 13 in the stud bolt 6, the side surface 38 abuts against the inner circumferential surface of the stud bolt 6 that defines the central hole 13 nearly in linear contact therewith. The square cross-sectional shape illustrated in FIG. 8 is indicated partly in two-dot-and-dash lines in FIG. 9 for comparison between the cross-sectional shapes illustrated in FIGS. 8 and 9 and the positional relation between them.

—Lower Jaw—

Figure 10:
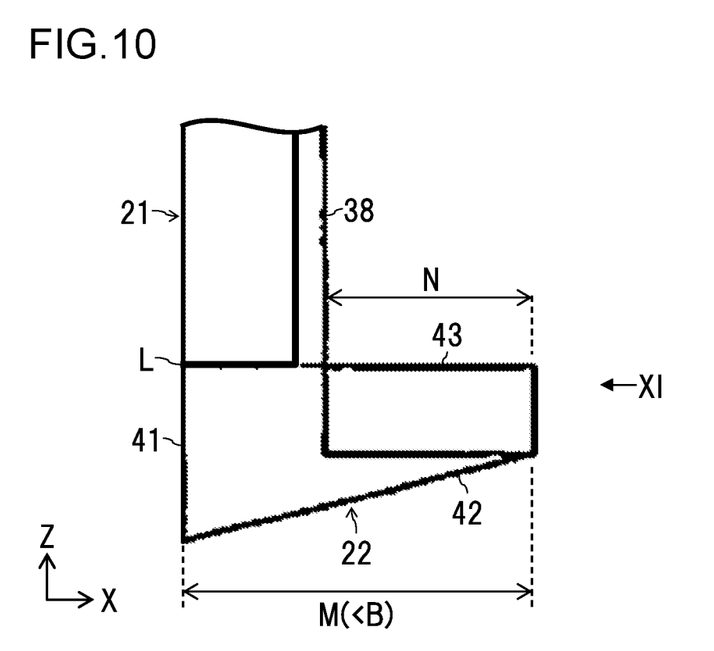
FIG. 10 is an enlarged elevational view of a lower jaw of the length measuring jig illustrated in FIG. 3.
Figure 11:
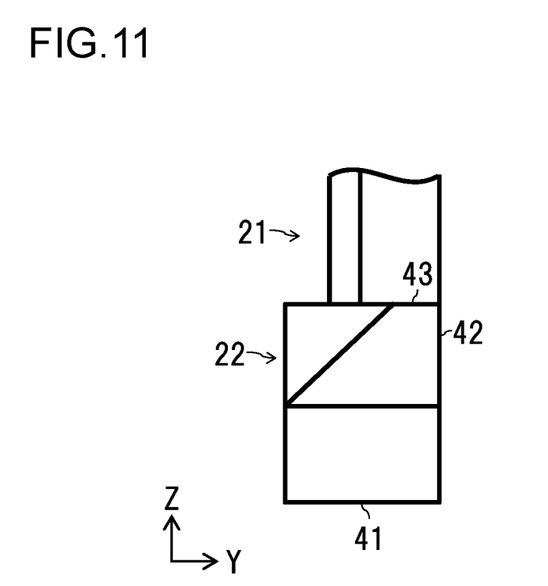
FIG. 11 is a side elevational view of the lower jaw as seen in the direction indicated by the arrow XI of FIG. 10.

FIG. 10 illustrates the lower jaw 22 in enlarged elevation. FIG. 11 illustrates the lower jaw 22 in side elevation as seen in the direction indicated by the arrow XI of FIG. 10. The lower jaw 22 is a component to be brought into abutment against an end face of one end of the stud bolt 6 in a direction along the Z-axis, i.e., the lower end of the stud bolt 6. The lower jaw 22 is provided on the tip end of the rod 21, i.e., the lower end of the rod 21 along the Z-axis. The lower jaw 22 includes a base 41 joined to the rod 21 and a hook 42, referred to above, protruding transversely from the base 41 in a direction along the X-axis, i.e., in the direction in which the side surface 38 of the rod 21 faces, and toward the inner wall surface 36 of the cap 25. The lower jaw 22 also includes a measuring surface 43 for abutting against the end face of the one end of the stud bolt 6 along the Z-axis, i.e., the lower end of the stud bolt 6. The measuring surface 43 is provided as an upper surface of the hook 42 of the lower jaw 22. Specifically, the measuring surface 43 faces in the other direction, i.e., upwardly, along the Z-axis, and lying parallel to and facing the measuring surface 33 of the upper jaw 24. As illustrated in FIG. 11, the hook 42 of the lower jaw 22 is progressively thinner toward the upper jaw 24. The measuring surface 43 has a smaller width along the Y-axis than the width of the base 41 of the lower jaw 22, and abuts against the end face of the lower end of the stud bolt 6 nearly in linear contact therewith when the rod 21 inserted in the central hole 13 is pulled upwardly. The lower jaw 22 has a length along the Z-axis that is progressively smaller along the X-axis toward the tip end of the hook 42. Therefore, the lower jaw 22 is tapered along the X-axis toward the tip end of the hook 42. The tapered shape of the lower jaw 22 allows the lower jaw 22 to be accommodated in its entirety in a gap that is present between the bottom of the blind hole 8 and the stud bolt 6 when the stud bolt 6 is threaded into the blind hole 8 in the flange 4, as illustrated in FIG. 2.

According to the present embodiment, the lower jaw 22 is integrally formed with the tip end of the rod 21. The lower jaw 22 is defined not as only a portion protruding from the rod 21 along the X-axis, but as a portion beneath the tip end of the rod 21, i.e., a portion beneath a broken line L illustrated in FIG. 10. The lower jaw 22 has an overall length M along the X-axis that is set to a value smaller than the minimum diameter B of the central hole 13 in the stud bolt 6. Under the condition of the overall length M thus set, the portion of the lower jaw 22 that protrudes from the side surface 38 of the rod 21 has a length N set to as large a value as possible. The length N is larger than the dimension along the X-axis of the beveled edge 14 of the lower end of the stud bolt 6 around the central hole 13. Consequently, when the rod 21 is inserted into the central hole 13 in the stud bolt 6, the lower jaw 22 moves past the minimum-diameter portion of the central hole 13 and out of the central hole 13. When the rod 21 is then laterally displaced in the central hole 13 toward the inner circumferential surface of the stud bolt 6, the lower jaw 22 moves radially beyond the beveled edge 14 onto the end face of the stud bolt 6 where the measuring surface 43 can contact the end face of the stud bolt 6.

—Method of Measuring the Length of a Stud Bolt—

A method of measuring the length of the stud bolt 6 mounted on the steam turbine casing 1 using the length measuring jig 20 will be described below. For measuring the length of the stud bolt 6, the nut 7 is removed from the stud bolt 6 to remove a tensile load on the stud bolt 6. In FIG. 2, the upper half casing 3 is omitted from illustration for illustrative purposes. However, the length measuring jig 20 may measure the length of the stud bolt 6 with the upper half casing 3 mounted on the lower half casing 2, as described above.

After the nut 7 has been removed from the stud bolt 6 whose length is to be measured, the cap 25 is fitted into the central hole 13 in the stud bolt 6, and the rod 21 is inserted through the cap 25 into the central hole 13 until the lower jaw 22 goes through the central hole 13. Typically, for example, the cap 25 is fitted into the central hole 13 in the stud bolt 6, and the rod 21 is inserted through the slit 35 of the cap 25 into the central hole 13. At this time, the rod 21 is inserted into the central hole 13 until the lower jaw 22 goes through the central hole 13, i.e., until the lower jaw 22 reaches the bottom of the blind hole 8 in the flange 4. The slider 23 may have been installed on the rod 21 when the rod 21 is inserted through the cap 25 into the central hole 13, or may be installed on the rod 21 after the rod 21 has been inserted through the cap 25 into the central hole 13. Alternatively, after the rod 21 alone has been inserted into the central hole 13, the cap 25 and the slider 23 may successively be placed over the rod 21 and the cap 25 may be fitted into the central hole 13.

Then, the slider 23 is installed on the rod 21 to bring the upper jaw 24 into abutment against the exposed end face of upper end of the stud bolt 6, and the slider 23 is slid radially of the central hole 13 to cause the measuring surface 33 of the upper jaw 24 to slide on the end face of the stud bolt 6. At this time, the slider 23 is slid in a direction to cause the rod 21 to move along the slit 35 in the cap 25 toward the inner wall surface 36 of the cap 25, i.e., in the direction along which the hook 42 of the lower jaw 22 extends, until the rod 21 stops in abutment against the inner wall surface 36 of the cap 25. When the rod 21 abuts against the inner wall surface 36, the rod 21 protruding upwardly from the slider 23 is pushed in the direction of the screw clamp 32 to confirm that the side surface 38 of the portion 37 of the rod 21 is abutting against the inner circumferential surface of the stud bolt 6 that defines the minimum-diameter portion of the central hole 13.

When the rod 21 is held in abutment against the inner wall surface 36 of the cap 25 and the inner circumferential surface of the stud bolt 6, the rod 21 is axially pulled upwardly to bring the lower jaw 22 into abutment against the end face of the lower end of the stud bolt 6. While the stud bolt 6 is being thus clamped between the lower jaw 22 and the upper jaw 24, the length of the stud bolt 6 is measured from a reading of the graduated scales 31 and 39.

Alternatively, after the stud bolt 6 has been clamped between the lower jaw 22 and the upper jaw 24, the screw clamp 32 may be tightened to secure the slider 23 to the rod 21, and then the length measuring jig 20 may be pulled out of the central hole 20. Thereafter, the length of the stud bolt 6 may be measured by measuring the distance between the measuring surfaces 33 and 43 with a measuring instrument such as an inside micrometer or the like.

A time-dependent change in the length of the stud bolt 6 can be grasped from the length thus measured of the stud bolt 6 and measured values in the past, so that the remaining service life of the stud bolt 6 can be assessed.

—Advantages—

(1) According to the present embodiment, as described above, the length of the tubular stud bolt 6 with the central hole 13 extending therethrough can directly be measured while the stud bolt 6 remains mounted on a target product such as a steam turbine casing 1, for example. Since the rod 21 is elongate, the length of the stud bolt 6 cannot be measured accurately if the rod 21 in the central hole 13 is inclined to the central axis O of the stud bolt 6. According to the present embodiment, as the inner wall surface 36 of the cap 25 is positioned depending on the minimum diameter B of the central hole 13, it is possible to keep the rod 21 parallel to the central axis O of the stud bolt 6 by holding the rod 21 in abutment against the inner wall surface 36 of the cap 25 and the inner circumferential surface of the stud bolt 6 that defines the minimum-diameter portion of the central hole 13. Therefore, the length of the stud bolt 6 can be measured highly accurately.

When the length of a different stud bolt 6 is to be measured, the cap 25 may be adjusted in shape or may be replaced with another cap 25 depending on the shapes of the central hole 13 in the stud bolt 6 and the beveled edge 15 of the stud bolt 6. In this manner, the length measuring jig 20 are applicable to measuring the lengths of various types of stud bolts.

Inasmuch as the length measuring jig 20 can measure the length of the stud bolt 6 without removing the stud bolt 6 from a target product, the number of man-hours required to measure the lengths of many stud bolts 6 is much smaller than if the stud bolts 6 are removed one by one from the target product for length measurement. As no complex devices are needed to measure the length of the stud bolt 6, it is not necessary to keep ready operators skilled to operate those complex devices. It is highly advantageous to measure the length of the stud bolt 6 in a simple measuring procedure using the length measuring jig 20. Since complex devices and their operators are not required, the cost of a maintenance process including measurement of the length of the stud bolt 6 is relatively low.

(2) If the rod 21 has the square cross-sectional shape illustrated in FIG. 8 uniformly from one end to the other, then corners of the square cross-sectional shape of the rod 21 tend to interfere with the inner circumferential surface of the stud bolt 6 that defines the minimum-diameter portion of the central hole 13, possibly restricting the movement of the rod 21 along the slit 35 in the cap 25. In this case, the overall length M and the length N (see FIG. 10) of the lower jaw 22 are limited because the lower jaw 22 needs to pass through the minimum-diameter portion of the central hole 13, possibly resulting in a failure to reach the end face of the lower end of the stud bolt 6 beyond the beveled edge 14 the lower end of the stud bolt 6 around the central hole 13.

According to the present embodiment, on the other hand, as illustrated in FIG. 9, the portion 37 of the rod 21 for abutment against the inner circumferential surface of the stud bolt 6 that defines the minimum-diameter portion of the central hole 13 has the beveled corner, and has its cross-sectional shape progressively narrower in the direction along which the lower jaw 22 extends. Consequently, the rod 21 can be brought closer as a whole to the inner circumferential surface of the stud bolt 6 that defines the minimum-diameter portion of the central hole 13 than if the rod 21 has the square cross-sectional shape illustrated in FIG. 8 uniformly from one end to the other. The length N that the hook 42 of the lower jaw 22 protrudes, which can be secured under the limiting condition for the lower jaw 22, is made sufficiently useful to cause the hook 42 to reach the end face of the lower end of the stud bolt 6 beyond the beveled edge 14 the lower end of the stud bolt 6 around the central hole 13.

However, the rod 21 does not necessarily need to be of the square cross-sectional shape, but may have a circular cross-sectional shape, for example. In case the rod 21 has a circular cross-sectional shape, the circular cross-sectional shape does not need to be changed in a portion of the rod 21 that abuts against the inner circumferential surface of the stud bolt 6 that defines the minimum-diameter portion of the central hole 13. However, the circular cross-sectional shape may possibly make it difficult for the rod 21 to have the main scale 39 because the outer circumferential surface thereof is a round surface. Stated otherwise, the rod 21 that has the square cross-sectional shape is advantageous in that since it has flat outer surfaces, it is easy to provide the main scale 39 on one of the flat outer surfaces.

(3) Since the rod 21 is guided by the slit 35 in the cap 25 to move radially of the stud bolt 6, the cap 25 can be fitted into the central hole 13 and the rod 21 can be inserted into the central hole 13 in random order. The length of the stud bolt 6 can be measured after the rod 21 has been fixed to the slider 23 by the screw clamp 32 and the length measuring jig 20 has been pulled out of the stud bolt 6.

To achieve the primary advantage (1) referred to above, the slit 35 in the cap 25 may be shaped to match the cross-sectional shape of the rod 21 such that the rod 21 is not movable radially of the cap 25 when the rod 21 is inserted through the cap 25. According to such a modification, the length of the stud bolt 6 can be measured by first inserting the rod 21 into the central hole 13 and then lowering the cap 25 down the rod 21 until the cap 25 is fitted into the central hole 13. Providing the inner wall surface 36 has enough positional accuracy, the rod 21 is placed in a desired length measuring position by fitting the cap 25 into the central hole 13.

(4) As illustrated in FIG. 11, the lower jaw 22 is progressively thinner toward the upper jaw 24. Consequently, the measuring surface 43 abuts against the end face of the lower end of the stud bolt 6 nearly in linear contact therewith when the rod 21 inserted in the central hole 13 is pulled upwardly. The measuring surface 43 that abuts against the end face of the lower end of the stud bolt 6 nearly in linear contact therewith is effective to restrain a reduction in the accuracy with which to measure the length of the stud bolt 6 due to irregular localized contact which otherwise occurs between the measuring surface 43 and the end face of the lower end of the stud bolt 6.

(5) As described above, it is possible to measure the length of the stud bolt 6 by measuring the distance between the measuring surfaces 33 and 43 after the length measuring jig 20 has been removed from the stud bolt 6. However, when the length measuring jig 20 is pulled out of the stud bolt 6, the rod 21 may possibly be displaced with respect to the slider 23, resulting in a reduction in the accuracy with which to measure the length of the stud bolt 6.

According to the present embodiment, on the other hand, since the slider 23 and the rod 21 have the respective graduated scales 31 and 39, the length of the stud bolt 6 can be measured from a reading of the graduated scales 31 and 39 without removing the length measuring jig 20 from the stud bolt 6 while the measuring surfaces 33 and 43 are clamping the stud bolt 6 therebetween.

DESCRIPTION OF REFERENCE CHARACTERS

1: Casing (product)
2: Lower half casing (first part)
3: Upper half casing (second part)
6: Stud bolt
7: Nut
11: Threaded portion (threaded portion on one side in longitudinal direction)
12: Threaded portion (threaded portion on other side in longitudinal direction)
13: Central hole 20: Length measuring jig
21: Rod
22: Lower jaw (first jaw)
23: Slider
24: Upper jaw (second jaw)
25: Cap
35: Slit
42: Hook
B: Diameter of minimum-diameter portion of central hole
F: Distance from central axis
O: Central axis

What is claimed is:

1. A length measuring jig for measuring a length of a stud bolt for fastening a first part and a second part of a product to each other, while the stud bolt remains mounted on the product, the stud bolt having a through central hole defined therein that has different diameters in different longitudinal portions, a threaded portion on one side in longitudinal direction thereof that is to be threaded into the first part, and a threaded portion on another side in longitudinal direction thereof to which a nut is attached, the length measuring jig comprising:
 a rod to be inserted into the central hole in the stud bolt;
 a first jaw that is provided on a tip end of the rod and caused to abut against an end face of the one side in longitudinal direction of the stud bolt;
 a slider on which the rod is slidably supported;
 a second jaw that is provided on the slider and caused to abut against an end face of the other side in longitudinal direction of the stud bolt; and
 a cap that is to be fitted in the central hole in the stud bolt and has a slit defined therein for allowing the rod to extend therethrough, wherein
 the first jaw has an overall length smaller than a diameter of a minimum-diameter portion of the central hole in the stud bolt, and
 the cap has an inner wall surface defining an end of the slit in the cap, and a distance to the inner wall surface from a central axis of the stud bolt is equal to a radius of the minimum-diameter portion of the central hole in a state in which the cap is fitted in the central hole in the stud bolt.

2. The length measuring jig according to claim 1, wherein the first jaw has a hook protruding transversely of the rod, the rod having a portion for abutting against an inner circumferential surface of the minimum-diameter portion of the central hole, the portion having a cross-sectional shape progressively smaller in a direction along which the hook extends.

3. The length measuring jig according to claim 1, wherein the rod can be guided by the slit in the cap to move radially of the stud bolt.

4. The length measuring jig according to claim 1, wherein the first jaw is progressively thinner toward the second jaw.

5. The length measuring jig according to claim 1, wherein the slider and the rod have respective graduated scales.

6. A method of measuring a length of a stud bolt for fastening a first part and a second part of a product to each other, while the stud bolt remains mounted on the product, the stud bolt having a through central hole defined therein that has different diameters in different longitudinal portions, a threaded portion on one side in longitudinal direction thereof that is to be threaded into the first part, and a threaded portion on another side in longitudinal direction thereof to which a nut is attached, the length measuring jig including:
 a rod to be inserted into the central hole in the stud bolt;
 a first jaw that is provided on a tip end of the rod and caused to abut against an end face of the one side in longitudinal direction of the stud bolt;
 a slider on which the rod is slidably supported;
 a second jaw that is provided on the slider and caused to abut against an end face of the other side in longitudinal direction of the stud bolt; and
 a cap that is to be fitted in the central hole in the stud bolt and has a slit defined therein for allowing the rod to extend therethrough,
 the first jaw having an overall length smaller than a diameter of a minimum-diameter portion of the central hole in the stud bolt,
 the cap having an inner wall surface defining an end of the slit in the cap, the distance to the inner wall surface from a central axis of the stud bolt being equal to a radius of the minimum-diameter portion of the central hole in a state in which the cap is fitted in the central hole in the stud bolt,
the method comprising:
 fitting the cap into the central hole in the stud bolt and inserting the rod through the slit in the cap into the central hole until the first jaw moves out of the central hole;
 holding the second jaw in abutment against the end face of the other side in longitudinal direction of the stud bolt, and sliding the slider radially of the central hole until the rod abuts against the inner wall surface of the cap and an inner circumferential surface of the stud bolt that defines the minimum-diameter portion of the central hole; and
 holding the first jaw in abutment against the end face of the one side in longitudinal direction of the stud bolt to measure the length of the stud bolt.

* * * * *